US009295926B2

(12) United States Patent
Nieuwoudt et al.

(10) Patent No.: US 9,295,926 B2
(45) Date of Patent: Mar. 29, 2016

(54) CROSS FLOW TRAY AND SUPPORT SYSTEM FOR USE IN A MASS TRANSFER COLUMN

(71) Applicant: Koch-Glitsch, LP, Wichita, KS (US)

(72) Inventors: Izak Nieuwoudt, Wichita, KS (US); Darran Matthew Headley, Valley Center, KS (US); David R. Ewy, Goddard, KS (US); Gary W. Gage, Grand Prairie, TX (US)

(73) Assignee: Koch-Glitsch LP, Wichita, KS (US)

( * ) Notice: Subject to any disclaimer, the term of this patent is extended or adjusted under 35 U.S.C. 154(b) by 302 days.

(21) Appl. No.: 13/790,896

(22) Filed: Mar. 8, 2013

(65) Prior Publication Data

US 2013/0234348 A1 Sep. 12, 2013

Related U.S. Application Data

(60) Provisional application No. 61/609,680, filed on Mar. 12, 2012.

(51) Int. Cl.
*B01D 3/22* (2006.01)
*B01D 3/32* (2006.01)

(52) U.S. Cl.
CPC *B01D 3/22* (2013.01); *B01D 3/225* (2013.01); *B01D 3/326* (2013.01)

(58) Field of Classification Search
CPC ............ B01J 19/325; B01J 2219/32275; B01D 3/28; B01D 3/326; B01D 3/225; B01D 3/22
See application file for complete search history.

(56) References Cited

U.S. PATENT DOCUMENTS

| 821,323 | A | * | 5/1906 | Wurtz | ........................ | C10B 1/04 |
| | | | | | | 202/108 |
| 988,397 | A | * | 4/1911 | Steen | ...................... | A47B 13/00 |
| | | | | | | 108/24 |
| 1,796,135 | A | * | 3/1931 | Alexander | ............... | B01D 3/22 |
| | | | | | | 261/114.1 |
| 2,341,091 | A | * | 2/1944 | Glitsch | ................... | B01D 3/326 |
| | | | | | | 261/114.1 |
| 2,540,781 | A | * | 2/1951 | Glitsch | .................... | B01D 3/18 |
| | | | | | | 24/459 |
| 2,544,614 | A | * | 3/1951 | Rapisarda | .............. | B01D 3/328 |
| | | | | | | 261/114.5 |

(Continued)

FOREIGN PATENT DOCUMENTS

| CA | 2449407 | A1 | * | 12/2002 | ............... | B01D 3/20 |
| DE | 1920268 | A1 | * | 10/1970 | ............. | B01D 3/163 |
| GB | 647824 | A | * | 12/1950 | ............... | B01D 3/18 |

OTHER PUBLICATIONS

International Search Report for International Application No. PCT/US2013/029901, dated Jun. 24, 2013, 3 pages.

(Continued)

*Primary Examiner* — Duane Smith
*Assistant Examiner* — Stephen Hobson

(57) ABSTRACT

Cross flow trays are provided with a support system. The support system interconnects the upper cross flow tray to a downcomer of the lower cross flow tray to provide support for the upper tray. In some aspects, the support system may also interconnect the downcomer of the lower cross flow tray to an upper tray of an underlying pair, providing additional support for the assembly. Such tray assemblies may facilitate easier installation without impeding the performance of the column.

19 Claims, 15 Drawing Sheets

(56) References Cited

U.S. PATENT DOCUMENTS

| | | | | | |
|---|---|---|---|---|---|
| 2,646,977 | A | * | 7/1953 | Kraft | B01D 3/20 202/158 |
| 2,710,678 | A | * | 6/1955 | Rapisarda | B01D 3/326 24/571 |
| 2,711,307 | A | * | 6/1955 | Milmore | B01D 3/18 261/108 |
| 2,973,189 | A | * | 2/1961 | Chin | B01D 3/22 196/46 |
| 3,156,746 | A | * | 11/1964 | Kittel | B01D 3/22 261/114.1 |
| 3,338,566 | A | * | 8/1967 | Kittel | B01D 3/22 202/158 |
| 3,360,246 | A | * | 12/1967 | Eckert | B01D 3/008 261/97 |
| 3,573,172 | A | * | 3/1971 | Streuber | F28F 25/04 202/158 |
| 3,642,258 | A | * | 2/1972 | Stahl | B01D 3/326 261/113 |
| 3,729,179 | A | * | 4/1973 | Keller | B01D 3/20 261/114.1 |
| 3,822,869 | A | * | 7/1974 | Van Kleef | B01D 3/24 261/114.1 |
| 4,101,610 | A | * | 7/1978 | Kirkpatrick | B01D 3/22 202/158 |
| 4,275,021 | A | * | 6/1981 | Kirkpatrick | B01D 3/22 202/158 |
| 4,278,621 | A | * | 7/1981 | Sigmund | B01D 53/18 261/114.1 |
| 4,295,936 | A | * | 10/1981 | Farnham | B01D 3/14 202/153 |
| 4,356,132 | A | * | 10/1982 | Belyakov | B01D 3/22 261/114.1 |
| 4,499,035 | A | * | 2/1985 | Kirkpatrick | B01D 3/22 202/158 |
| 4,504,426 | A | * | 3/1985 | Chuang | B01D 3/22 202/158 |
| 5,047,179 | A | * | 9/1991 | Nye | B01D 3/20 261/114.1 |
| 5,049,319 | A | * | 9/1991 | Nye | B01D 3/20 261/114.1 |
| 5,164,125 | A | * | 11/1992 | Binkley | B01D 3/22 261/114.1 |
| 5,244,604 | A | * | 9/1993 | Miller | B01D 3/20 261/114.1 |
| 5,326,436 | A | * | 7/1994 | Sampath | B01D 3/20 202/158 |
| 5,951,827 | A | * | 9/1999 | Breedon | B01D 3/20 202/158 |
| 6,095,504 | A | * | 8/2000 | Heldwein | B01D 3/20 202/158 |
| 6,116,583 | A | * | 9/2000 | Agnello | B01D 3/20 261/114.1 |
| 6,131,891 | A | * | 10/2000 | Resetarits | B01D 3/20 202/158 |
| 6,267,359 | B1 | * | 7/2001 | Stippick | B01D 3/326 261/114.5 |
| 6,287,367 | B1 | * | 9/2001 | Buchanan | B01D 3/20 261/113 |
| 6,371,455 | B1 | * | 4/2002 | Lee | B01D 3/22 261/114.1 |
| 6,565,071 | B2 | * | 5/2003 | Chuang | B01D 3/22 261/114.5 |
| 6,592,106 | B1 | * | 7/2003 | Eaton, Jr. | 261/114.3 |
| 7,753,348 | B2 | * | 7/2010 | Lee | B01D 3/20 261/114.1 |
| 8,020,838 | B2 | * | 9/2011 | Heldwein et al. | 261/114.5 |
| 2003/0067085 | A1 | | 4/2003 | Shakur et al. | |
| 2004/0036186 | A1 | | 2/2004 | Lee et al. | |
| 2004/0080059 | A1 | * | 4/2004 | Weiland | B01D 3/20 261/79.2 |
| 2005/0218534 | A1 | | 10/2005 | Colic et al. | |
| 2009/0189301 | A1 | | 7/2009 | Lee et al. | |
| 2012/0228251 | A1 | * | 9/2012 | Headley | B01D 3/326 211/124 |
| 2012/0292791 | A1 | * | 11/2012 | Headley | B01D 3/225 261/114.1 |

OTHER PUBLICATIONS

Written Opinion of the International Searching Authority for International Application No. PCT/US2013/029901, dated Jun. 21, 2013, 5 pages.

* cited by examiner

CROSS FLOW TRAY AND SUPPORT SYSTEM FOR USE IN A MASS TRANSFER COLUMN

BACKGROUND OF THE INVENTION

The present invention relates generally to cross flow trays used in mass transfer columns in which mass transfer and/or heat exchange processes occur and, more particularly, to apparatus and methods for supporting such cross flow trays.

Cross flow trays are used within mass transfer columns to facilitate interaction between fluid streams flowing in countercurrent relationship within the column. The term mass transfer column as used herein is not intended to be limited to columns in which mass transfer is the primary objective of the processing of the fluid streams within the column, but is also intended to encompass columns in which heat transfer rather than mass transfer is the primary objective of the processing. The fluid streams are typically an ascending vapor stream and a descending liquid stream, in which case the cross flow trays are commonly referred to as vapor-liquid cross flow trays. In some applications, both fluid streams are liquid streams and the cross flow trays are commonly referred to as liquid-liquid cross flow trays. In still other applications, the ascending fluid stream is a gas stream and the descending fluid steam is a liquid stream, in which case the cross flow trays are referred to as gas-liquid cross flow trays.

The cross flow trays are positioned within the column in vertically spaced-apart relationship with each of the tray decks extending horizontally to fill the entire internal cross-section of the column. Each of the cross flow trays has a planar tray deck on and above which interaction between the ascending fluid stream and the descending fluid stream occurs, a plurality of apertures to allow upward passage of the ascending fluid stream through the tray deck and into the descending fluid stream to create a froth or mixture in which the desired mass transfer and/or heat exchange occurs, and at least one downcomer that directs the descending fluid stream from the associated tray deck to a tray deck on an underlying cross flow tray. The portion of the tray deck that receives the descending fluid stream from the downcomer of an overlying cross flow tray typically comprises an inlet panel that is either imperforate or contains bubble promoters or other structures that allow upward passage of the ascending fluid stream but impede the descending fluid stream from weeping through the inlet panel.

Cross flow trays having a single side downcomer located at one end of the tray deck are known as single-pass trays. In other applications, typically those involving higher descending liquid flow rates, multiple downcomers may be used on some or all of the cross flow trays. For example, in two-pass configurations, two side downcomers are positioned at opposite ends of one cross flow tray and a single center downcomer is positioned in the center of the adjacent cross flow trays. In four-pass configurations, one cross flow tray has two side downcomers and a center downcomer and the adjacent contact trays have two off-center downcomers.

The tray decks of cross flow trays are typically secured by clamps to support rings welded to the interior surface of the column shell. The downcomer walls are also normally bolted at their opposite ends to bolting bars that are welded to the interior surface of the column shell. In some applications, such as in larger diameter columns and in columns in which vibratory forces are a concern, it is known to add further support to portions of the tray deck by using a strut that extends upwardly from major beams, lattice trusses or a system of hangers to connect the tray deck of a cross-flow tray to the downcomer walls of a similar tray located directly above, or below. When hangers are utilized, the downcomer walls act as beams to carry a portion of the load of the coupled tray, thereby reducing sagging and bracing against uplift of the tray deck. These hangers and other structures, however, add complexity to the design and increase the cost of fabrication and installation of the cross flow tray.

In other applications, the inlet panel on the tray deck is formed as a structural beam to provide added support to the tray deck. The inlet panel must then be interconnected to the adjacent portions of the tray deck using fasteners of various types, thereby adding to the complexity in the design and the installation of the tray deck. A need has thus arisen for a method of supporting and bracing the tray deck while reducing the disadvantages resulting from the conventional methods of providing additional support in larger diameter columns and in columns in which vibratory forces are present.

SUMMARY OF THE INVENTION

In one aspect, the present invention is directed to a tray assembly for use in a mass transfer column. The tray assembly comprises a first upper cross flow tray comprising a first generally planar upper tray deck and at least one downcomer for removing liquid from the first upper deck and a first lower cross flow tray vertically spaced from the first upper tray. The first lower tray comprises a first generally planar lower tray deck and an inlet area positioned proximate the downcomer of the first upper tray for receiving liquid from the first upper tray. The first lower tray further comprises at least one centrally located downcomer positioned at or near the center of the lower deck for removing liquid therefrom and the centrally located downcomer comprises a pair of spaced-apart parallel walls extending in a direction generally perpendicular to the direction of liquid flow across the first lower deck. The tray assembly also comprise a support system at least partially disposed between the first upper and lower trays. The support system comprises a plurality of horizontally-spaced braces coupled to and extending between the walls of the centrally located downcomer, a support beam coupled to a lower surface of the upper deck, and a plurality of elongated strut members coupled to and extending between the support beam and each of the braces.

In another aspect, the invention is directed to a mass transfer column comprising an outer column shell defining an open internal volume and at least one cross-flow tray assembly as described above positioned in the open internal volume of the shell.

DETAILED DESCRIPTION

Figure 1:
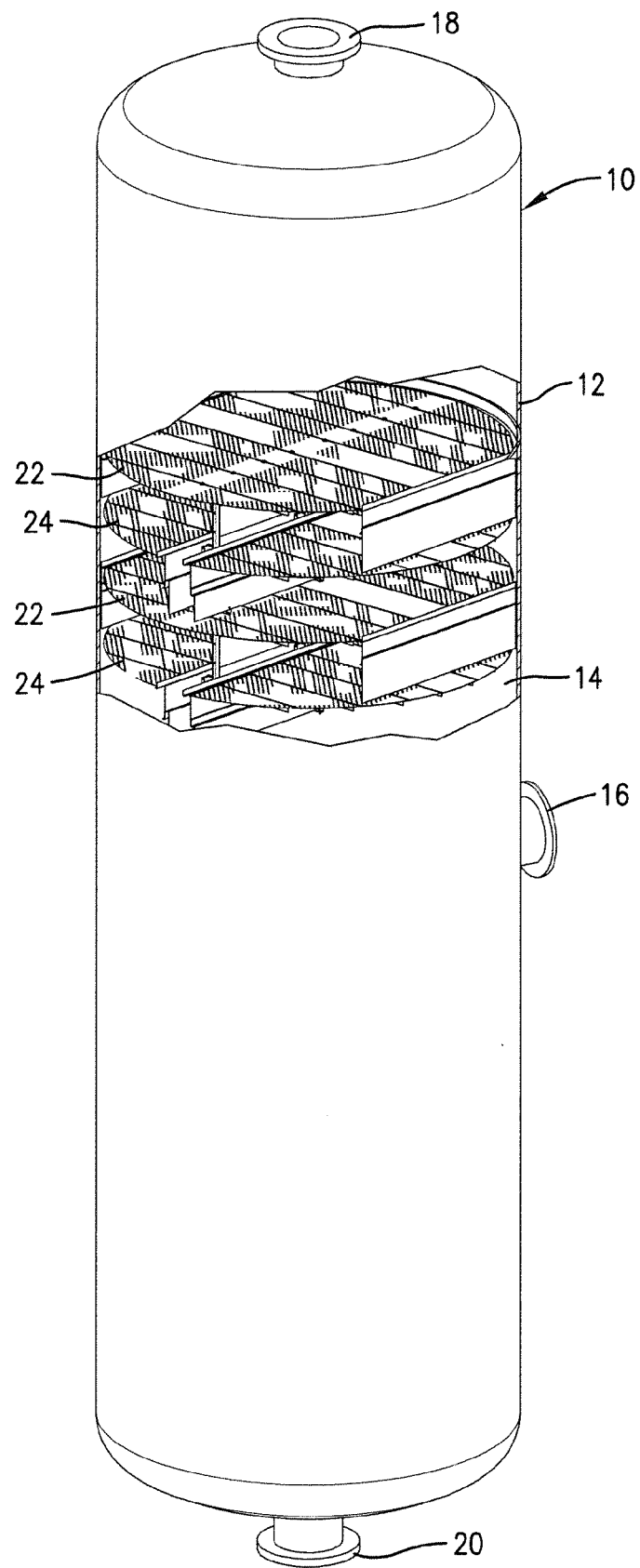
FIG. 1 is a side elevation view of a mass transfer column in which mass and/or heat transfer are intended to occur and in which a portion of the column shell is broken away to show the upper and lower cross flow trays of the present invention.

Turning now to the drawings in greater detail and initially to FIG. 1, a mass transfer column suitable for use in processes in which mass transfer and/or heat exchange is intended to occur between countercurrent-flowing fluid streams is represented generally by the numeral 10. Mass transfer column 10 includes an upright, external shell 12 that is generally cylindrical in configuration, although other orientations, such as horizontal, and configurations, including polygonal, are possible and are within the scope of the present invention. Shell 12 is of any suitable diameter and height and is constructed from one or more rigid materials that are desirably inert to, or are otherwise compatible with the fluids and conditions present during operation of the mass transfer column 10.

Mass transfer column 10 is of a type used for processing fluid streams, typically liquid and vapor streams, to obtain fractionation products and/or to otherwise cause mass transfer and/or heat exchange between the fluid streams. For example, mass transfer column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the mass transfer column 10 through any number of feed lines 16 positioned at appropriate locations along the height of the mass transfer column 10. One or more vapor streams can also be generated within the mass transfer column 10 rather than being introduced into the mass transfer column 10 through the feed lines 16. The mass transfer column 10 will also typically include an overhead line 18 for removing a vapor product or byproduct and a bottom stream takeoff line 20 for removing a liquid product or byproduct from the mass transfer column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

Figure 2:
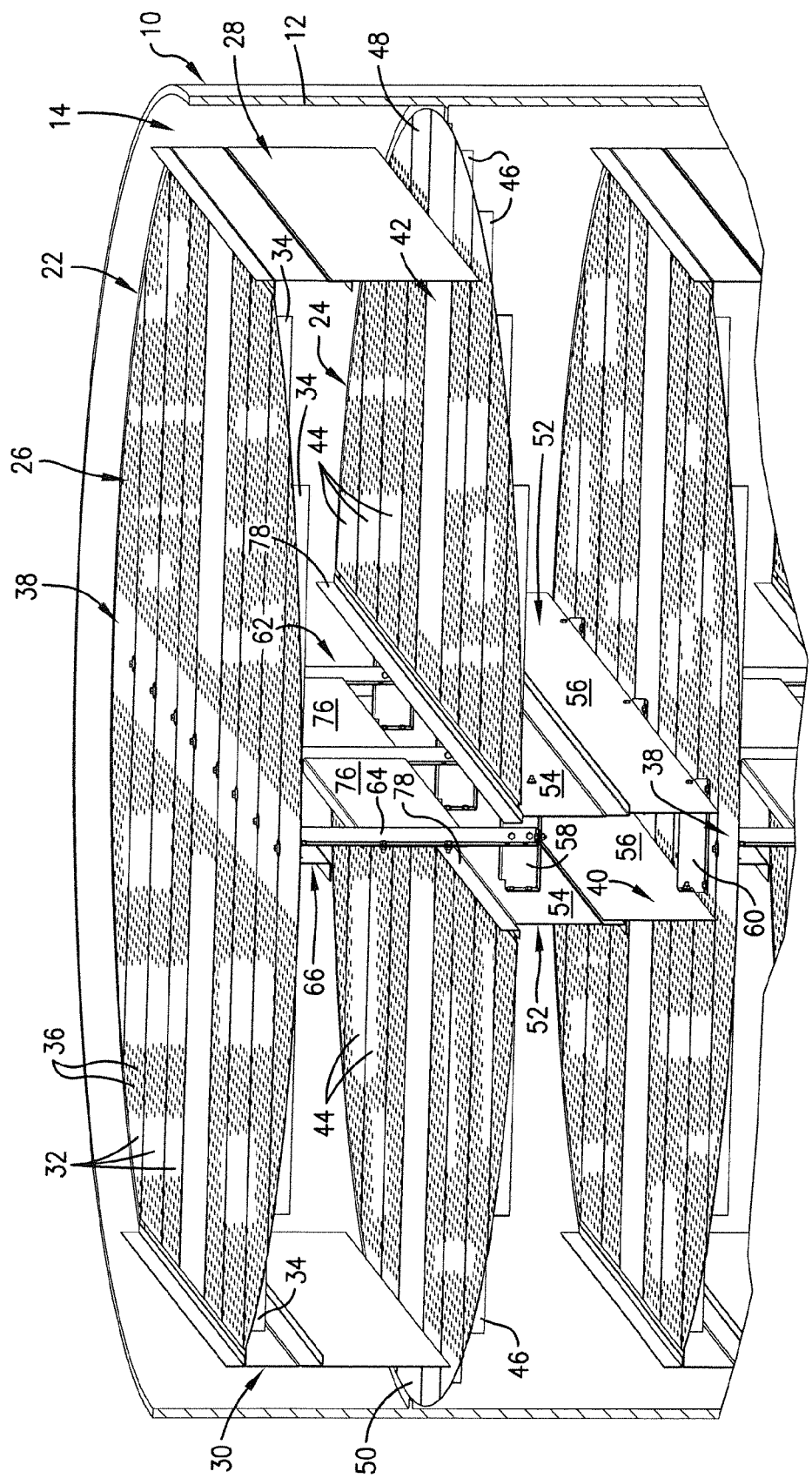
FIG. 2 is an enlarged, fragmentary, top perspective view of the mass transfer column shown in FIG. 1 with portions of the column shell broken away to show the upper and lower cross flow trays.
Figure 3:
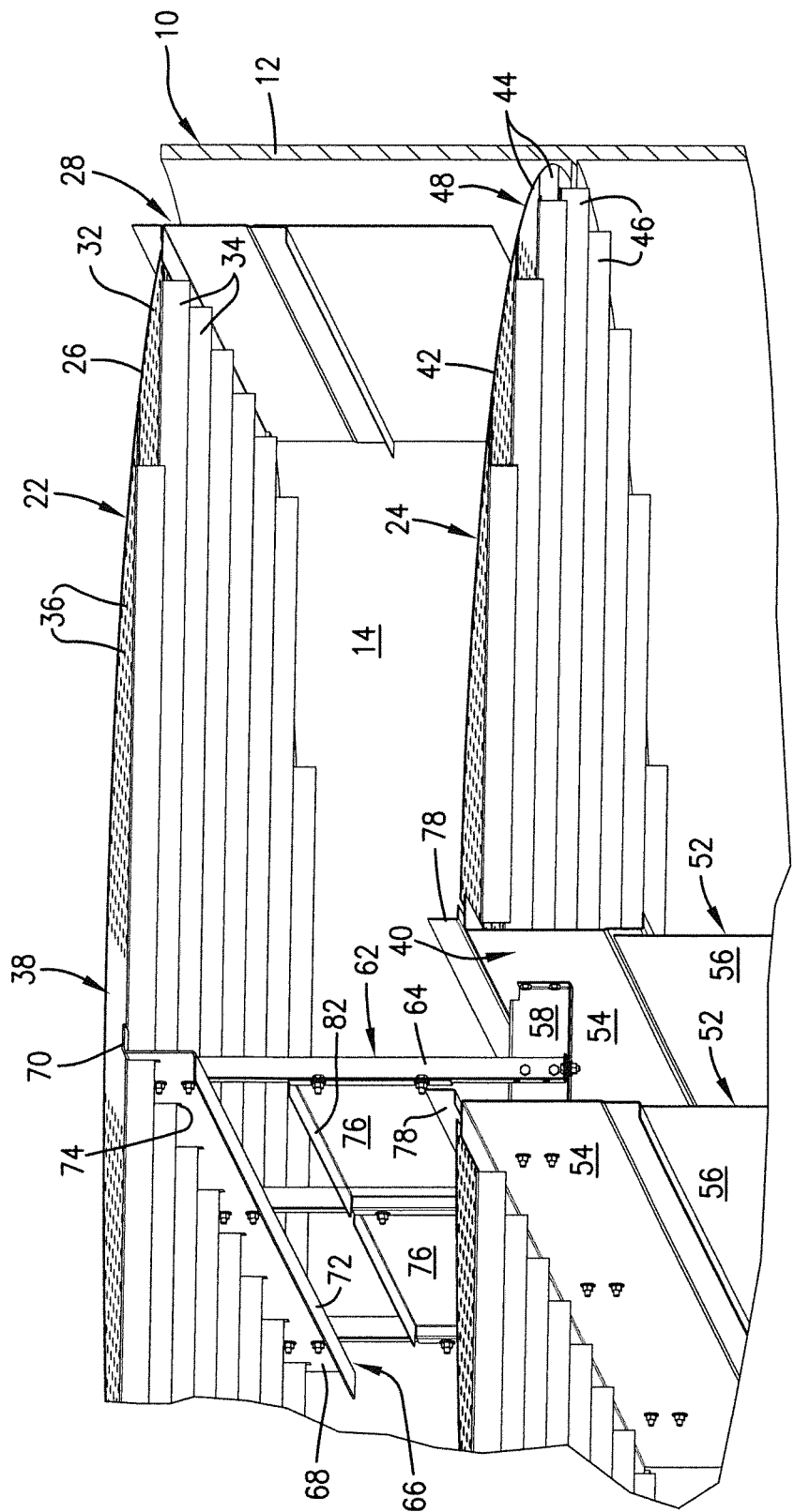
FIG. 3 is an fragmentary, bottom perspective view of a pair of the upper and lower cross flow trays shown in FIG. 2, but taken from a bottom perspective.

Turning additionally to FIGS. 2 and 3, any desired number of pairs of an upper cross flow tray 22 and a lower cross flow tray 24 constructed according to the present invention are positioned within the open internal region 14 of the mass transfer column 10 in vertically-spaced apart relationship with respect to each other. Each of the upper cross flow trays 22 comprises a generally planar tray deck 26 and two side downcomers 28 and 30 that are positioned at opposite ends of the tray deck 26. The tray deck 26 is formed from individual panels 32 that are joined together using any of various conventional methods. The panels 32 extend longitudinally in the direction from one end to the other end of the tray deck 26. In one embodiment, most or all of the panels 32 extend continuously between the ends of the tray deck 26. In another embodiment, most or all of the panels 32 extend from the ends of the tray deck 26 to the centerline of the tray deck 26 where they are joined together in a conventional fashion. Some or all of panels 32 include stiffening flanges 34 that extend perpendicularly downward from the panels 32, typically along one of the longitudinal edges of each of the panels 32.

Most of the tray deck 26 includes apertures 36 to allow an ascending vapor, gas or liquid stream to pass through the tray deck 26 for interaction with a liquid stream traveling along an upper surface of the tray deck 26. The apertures 36 can be in the form of simple sieve holes or directional louvers or they may include structures such as fixed or movable valves. The portion of the tray deck 26 containing the apertures 36 is known as the active area of the cross flow tray 24. A center portion of the tray deck 26 is imperforate and functions as an inlet region 38 for receiving liquid flowing downwardly from an overlying liquid distributor (not shown) or a center downcomer 40 of an overlying one of the lower cross flow trays 24. The inlet region 38 may include bubble promoters or other structures to allow the ascending fluid stream to pass upwardly through the center portion of the tray deck 26.

The lower cross flow tray 24 likewise comprises a tray deck 42 formed from interconnected individual deck panels 44 and containing apertures 36 of the type described above. The deck panels 44 contain downwardly extending stiffening flanges 46 along their longitudinal edges. Both end portions of the tray deck 26 of the lower cross flow tray 24 are normally imperforate and function as inlet regions 48 and 50 to receive the liquid flowing downwardly through the side downcomers 28 and 30 from the upper cross flow tray 22. The inlet regions 48 and 50 may include bubble promoters or other structures to allow the ascending fluid stream to pass upwardly through the end portions of the tray deck 42.

The lower cross flow tray 24 includes the center downcomer 40 that receives the liquid flowing towards the center of the tray deck 42 from the end portions and delivers it to the inlet panel 38 of the upper cross flow tray 22 in the next underlying pair of upper and lower cross flow trays 22 and 24.

The center downcomer 40 in each cross flow tray 24 comprises a pair of spaced apart, parallel walls 52 that extend in a chordal fashion across the open internal region 14 within the mass transfer column 10. Each wall 52 comprises an upper wall segment 54 and a lower wall segment 56 that may be vertically adjusted in relation to each other during installation of the upper and lower cross flow trays 22 and 24. Opposite ends of each wall 52 are bolted to bolting bars (not shown) that are welded to the internal surface of the shell 12.

A plurality of horizontally-spaced-apart upper braces 58 extend perpendicularly between and are bolted to the upper wall segments 54 of the center downcomer 40 to stiffen and maintain the desired spacing between the walls 52 of the center downcomer 40. A plurality of similar, horizontally-spaced-apart, lower braces 60 extend perpendicularly between and are bolted to the lower wall segments 56. The lower braces 60 also serve to stiffen and maintain the desired spacing between the walls 52. The lower braces 60 extend below a lower edge of the lower wall segments 56 and rest on and are bolted to the tray deck 26 of an underlying upper cross flow tray 22. In this manner, the lower braces 60 interconnect the walls 52 of the center downcomer 40 to the tray deck 26 of the underlying upper cross flow tray 22 to provide support to the center downcomer 40 and to maintain the desired vertical clearance 57 between the lower edge of the lower wall segments 56 and the tray deck 26 of the underlying upper cross flow tray 22.

Figure 4:
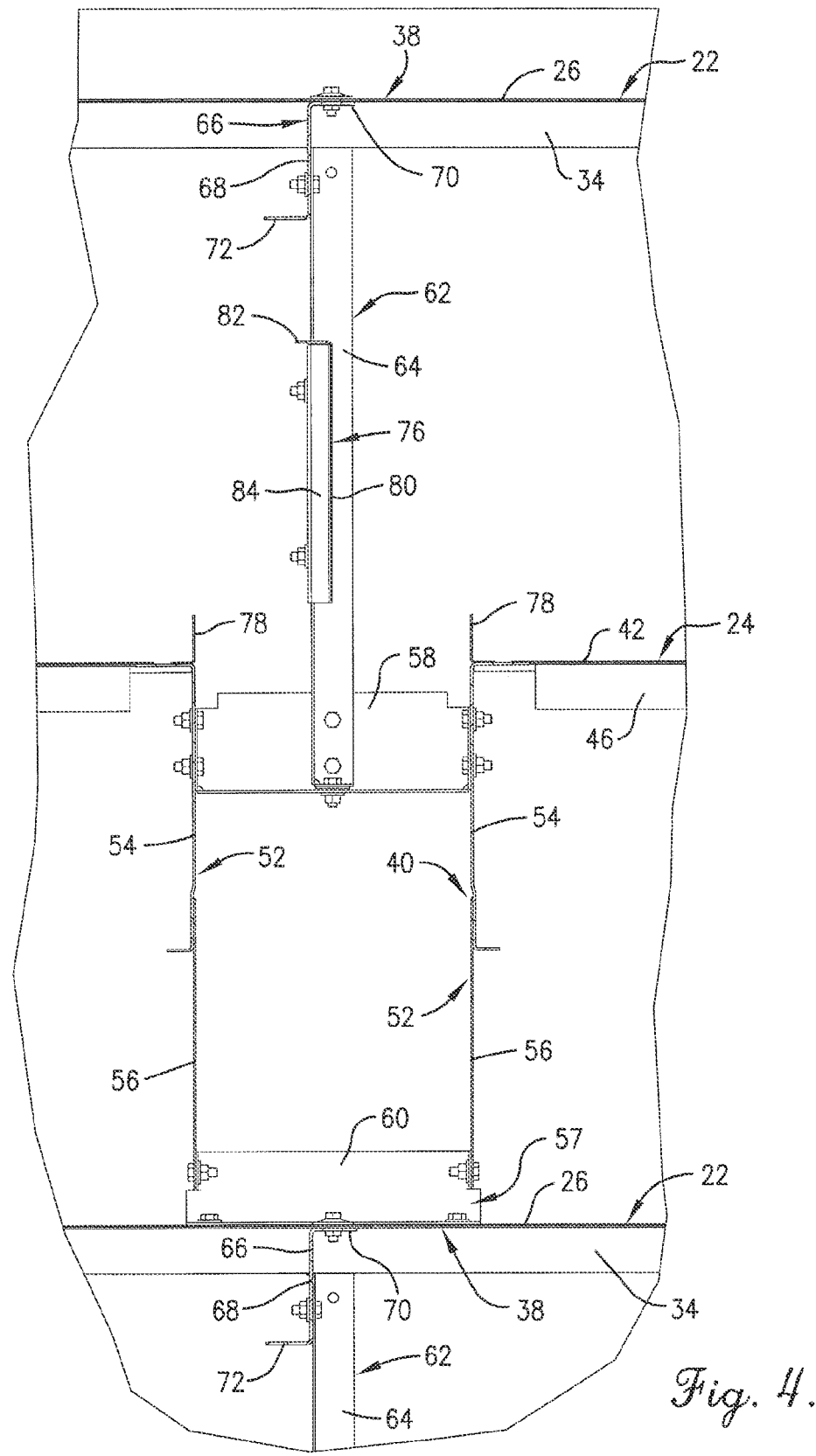
FIG. 4 is an enlarged, fragmentary, side elevation view of the upper and lower cross flow trays shown in FIG. 2.
Figure 5:
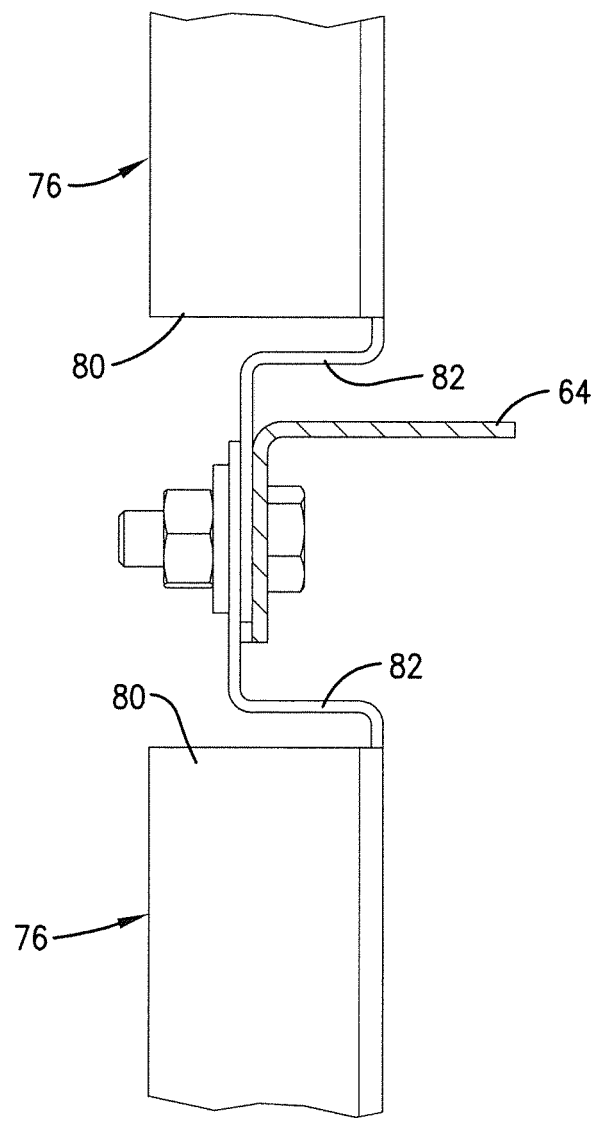
FIG. 5 is an enlarged, fragmentary, top plan view showing a portion of a support system for the upper cross flow tray taken in horizontal section.
Figure 6:
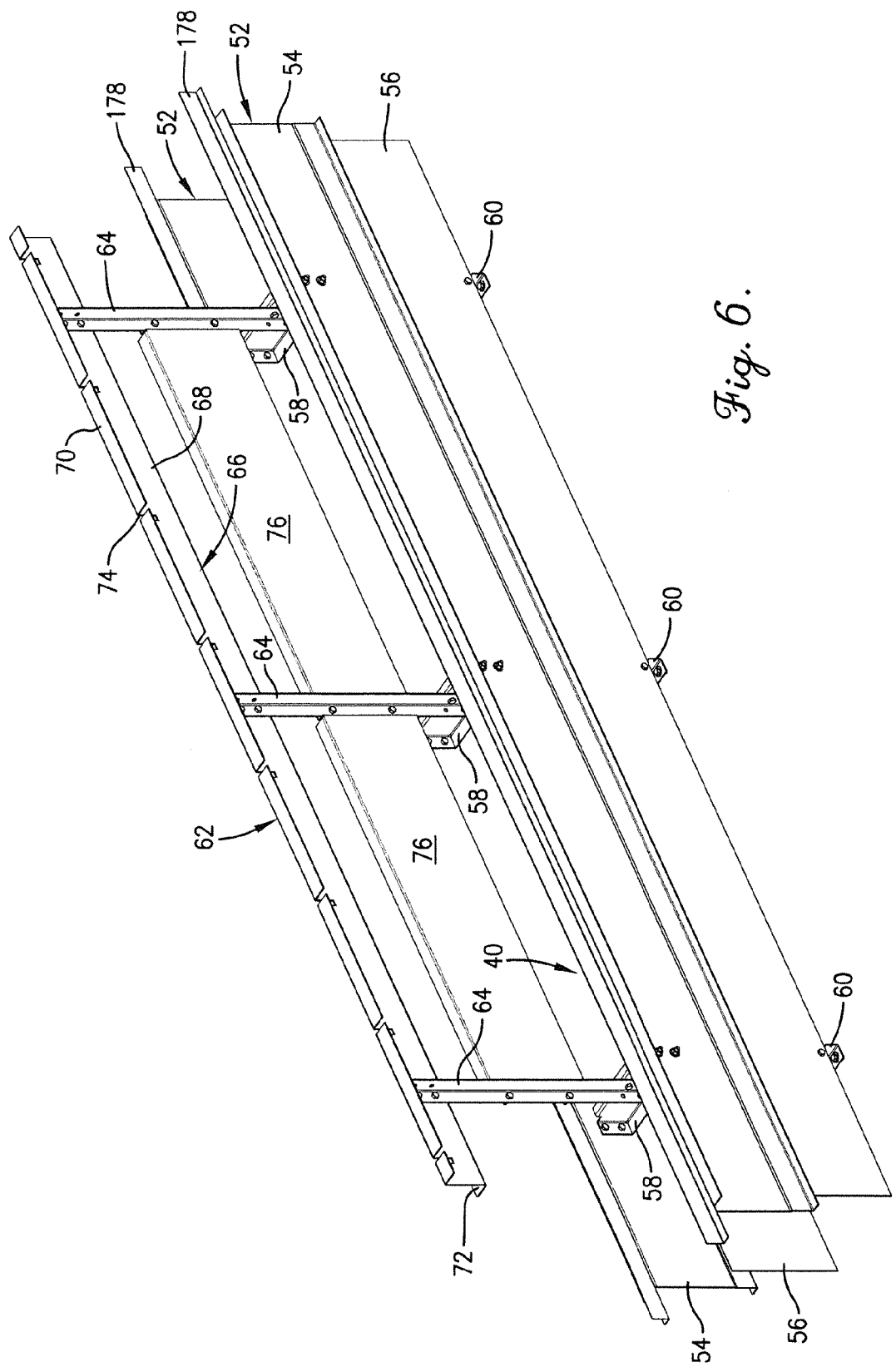
FIG. 6 is a top perspective view of the support system and a center downcomer.
Figure 7:
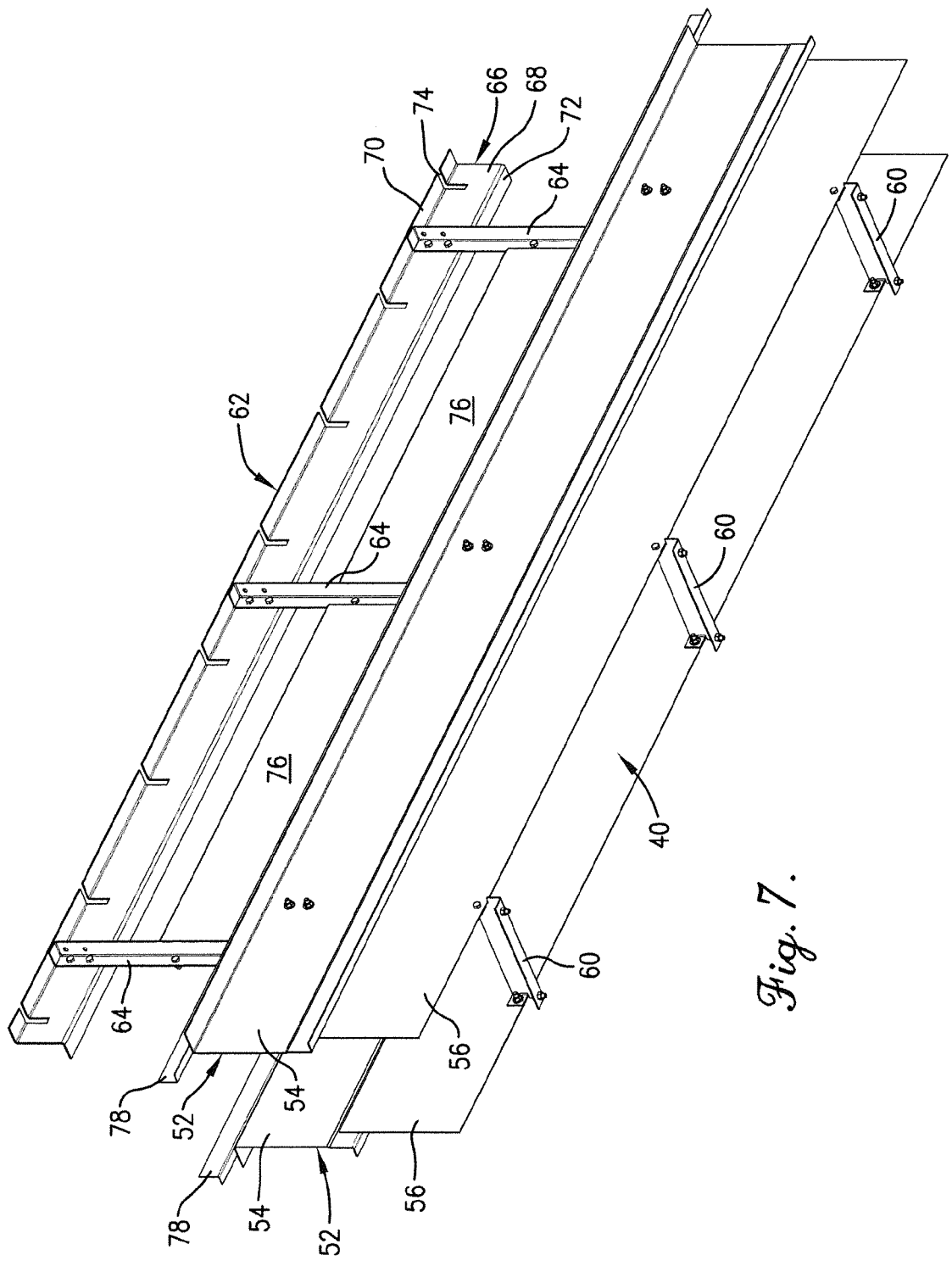
FIG. 7 is a bottom perspective view of the support system and the center downcomer.

Turning additionally to FIGS. 4-6, in accordance with the present invention, a support system 62 is provided to interconnect and support the center portion of the tray deck 26 of one or more of the upper cross flow trays 22 with the center downcomer 40 of the paired lower cross flow tray 24. The support system 62 comprises the upper braces 58, elongated struts 64 that are bolted or otherwise secured to the upper braces 58 and extend upwardly therefrom, and a horizontally-extending beam 66 that is bolted or otherwise secured to an upper end of each of the struts 64. The struts 64 are formed from angled metal stock or other suitable materials having the necessary strength, rigidity, and compatibility with the conditions within the mass transfer column 10. The number of struts 64 and the horizontal spacing between adjacent struts 64 can be varied and are selected based on the loads and vibratory forces expected in the intended application.

The beam 66 is likewise formed from metal or other suitable materials and, in one embodiment, comprises a vertical segment 68, an upper flange 70 that extends perpendicularly from an upper edge of the vertical segment 68 in one direction, and a lower flange 72 that extends perpendicularly from a lower edge of the vertical segment 68 in an opposite direction. Cutouts 74 (FIG. 6) are provided at spaced apart locations in the upper flange 70 and in part of the vertical segment 68 to accommodate the stiffening flanges 34 of the individual panels 32 in the tray deck 26 of the upper cross flow tray 22. Alternatively, the cutouts 74 may be omitted by removing the stiffening flanges 34 in the portions of the tray deck 26 that overlap the beam 66. The panels 32 of the tray deck 26 rest on the beam 66 and are bolted or otherwise secured the upper flange 70 of the beam 66. Shims may be placed between the lower end of one or more of the struts 64 and a flange on the upper brace 58 to which the strut 64 is mounted to level the tray deck 26 during installation.

Anti-jump baffles 76 extend between and are bolted or otherwise mounted to the struts 64. The anti-jump baffles 76 function to impede liquid and dense froth from jumping over rather than entering the center downcomer 40. The anti-jump baffles 76 are positioned so that their lower edges are roughly at the same horizontal elevation as an upper edge of weirs 78 positioned on the tray deck 42 at the inlet to the center downcomer 40. The anti-jump baffles 76 have a height sufficient to block the liquid and dense froth from jumping over the center downcomer 40, while at the same time allowing an upper edge of each anti-jump baffle 76 to be spaced a sufficient distance below the overlying upper cross flow tray 22 to permit vapor to readily flow above the anti-jump baffles 76.

Each anti-jump baffle 76 comprises a vertically-extending plate 80, a strengthening flange 82 at an upper and/or lower edge of the plate 80, and, as best shown in FIG. 5, a dog-legged mounting flange 84 positioned along each of the side edges of the plate 80. The mounting flanges 84 overlap and are bolted or otherwise secured to the struts 64. The dog-legged construction of the mounting flanges 84 allow the plates 80 and the struts 64 to be positioned along the longitudinal centerline of the center downcomer 40. Alternatively, the struts 64 can be offset slightly from the centerline so that the plates 80 can be positioned along the centerline without requiring the mounting flanges 84 to have a dog-legged construction.

It can be seen that the support system 62 interconnects the upper and lower cross flow trays 22 and 24 and functions to support the center portion of the upper cross flow tray 22 using the center downcomer 40 of the lower cross flow tray 24. The support system 62 eliminates the need for the tray deck 26 of the upper cross flow tray 26 to have a separate inlet panel that functions as a support beam and must be interconnected with the panels 32. Using the support system 62 to provide support at the center of the tray deck 26 allows some or all of the panels 32 to span from end to end of the tray deck 26 as a single piece, thereby greatly simplifying the design and installation of the tray deck 26. Alternatively, some or all of the panels 32 may extend from the end to the center of the tray deck 26 where they may abut or overlap panels 32 extending to the center from the other end of the tray 26. The abutting or overlapping panels 32 may then be bolted or otherwise secured to the beam 66 that underlies the panels 32.

The upper and lower cross flow trays 22 and 24 that are interconnected by the support system 62 are also interconnected to the underlying pair of upper and lower cross flow trays 22 and 24 by the lower braces 60 that join the center downcomer 40 to the tray deck 26 and/or the beam 66 of the support system 62 associated with the underlying pair of upper and lower cross flow trays 22 and 24. By interconnecting and supporting the upper and lower cross flow trays 22 and 24 in this manner, the upper and lower cross flow trays 22 and 24 are better able to resist the loading and vibratory forces exerted during operation of the column 10. The tray decks 26 and 42 are thus more likely to remain level and stationary during such operation.

Figure 8:
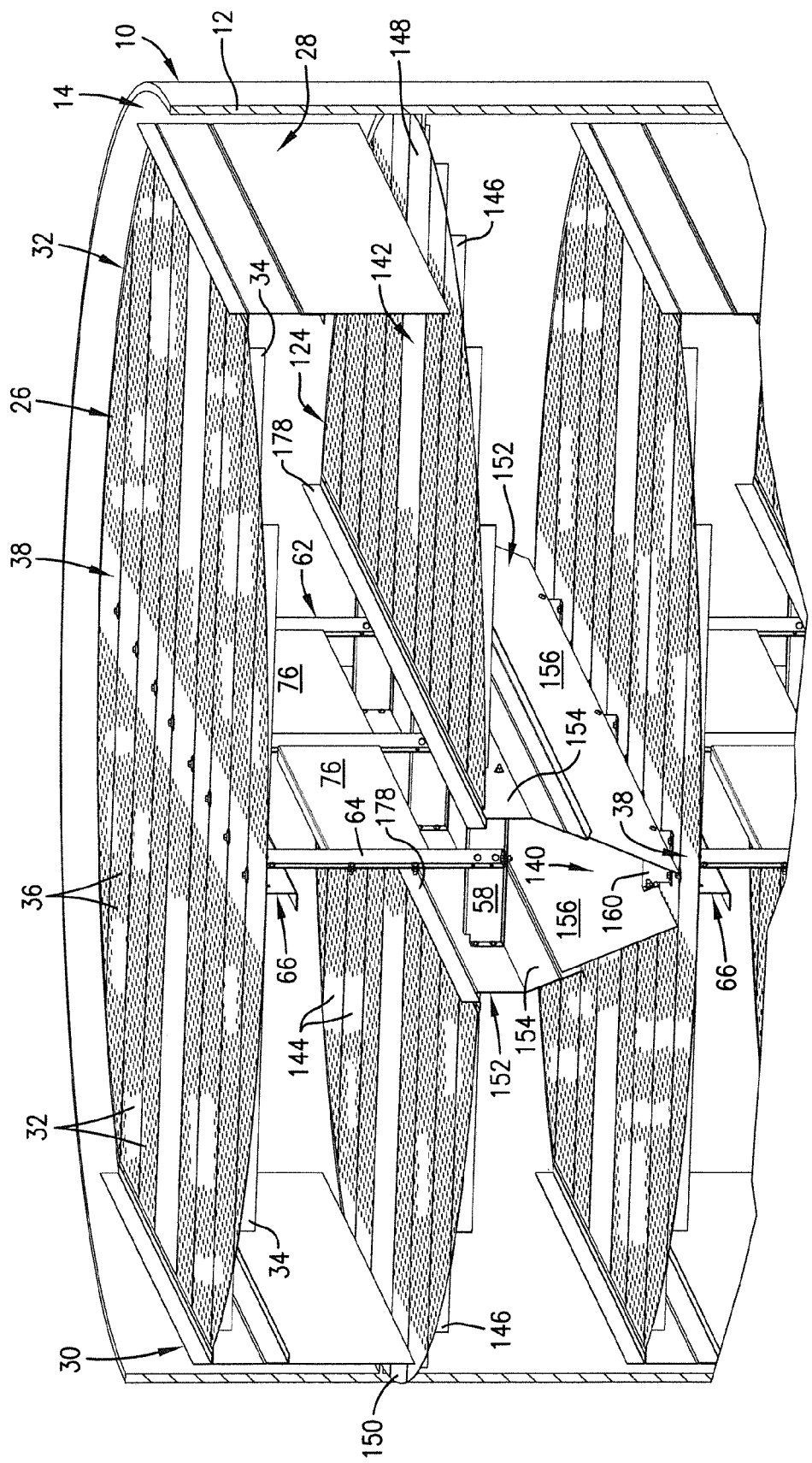
FIG. 8 is a fragmentary, side perspective view of a mass transfer column with portions of the column shell broken away to illustrate a second embodiment of the lower cross flow trays of the present invention.
Figure 9:
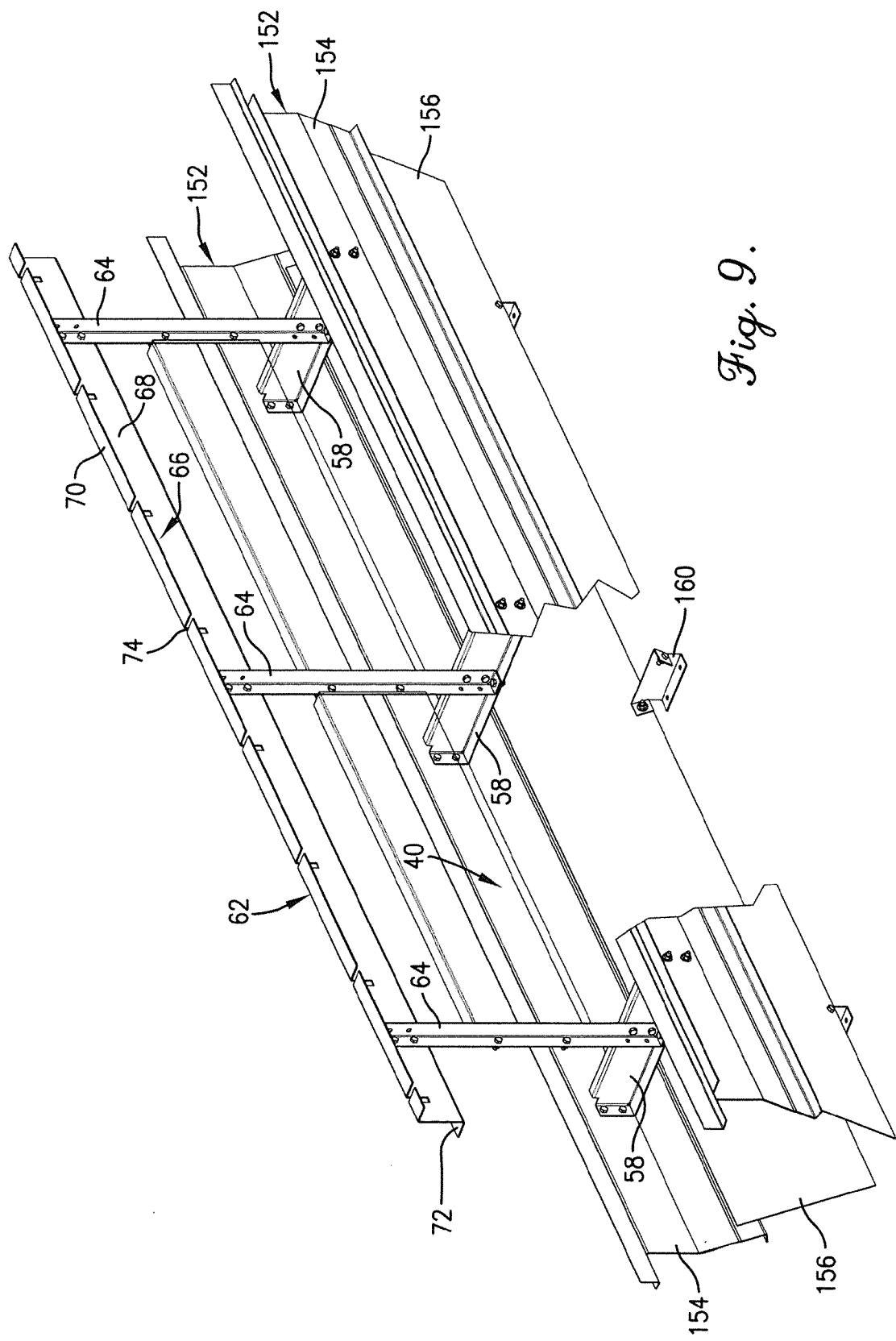
FIG. 9 is a top perspective view of another embodiment of a support system used with the center downcomer of the second embodiment of the lower cross flow trays.

The support system 62 can be used or readily adapted for use with center downcomers of various constructions. For example, in FIGS. 8 and 9, the support system 62 is used with a lower cross flow tray 124 that has a center downcomer 140 with inclined downcomer walls 152 rather than the vertical downcomer walls 52 associated with the center downcomer 40 of the lower cross flow tray 24 illustrated in FIGS. 1-4 and 6-8. In all other respects, the lower cross flow tray 124 of FIGS. 8 and 9 may have the same construction as the previously described lower cross flow trays 24 and the same reference numerals preceded by the numeral "1" are used to reference the like components.

Figure 10:
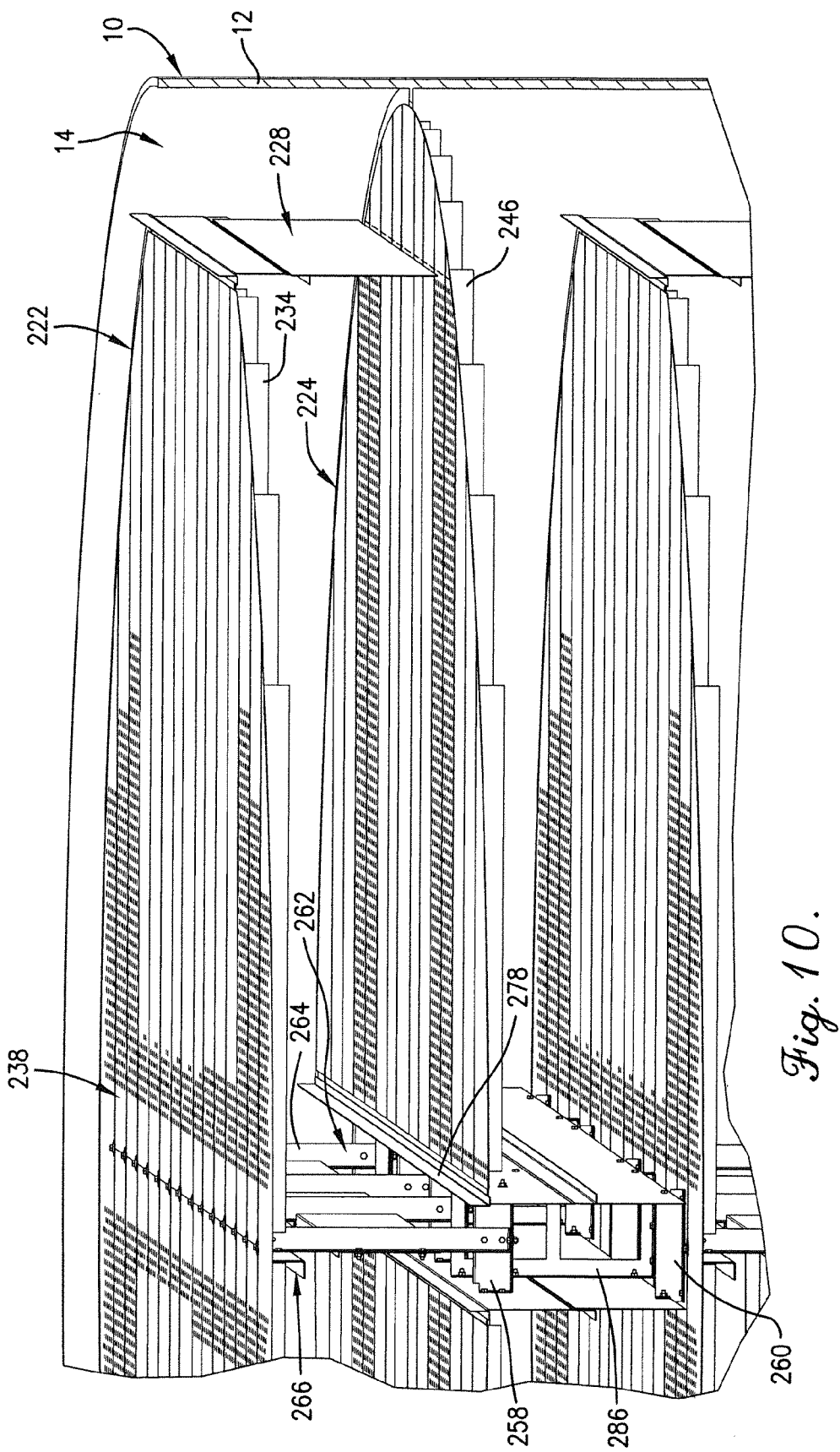
FIG. 10 is a fragmentary, side perspective view of a mass transfer column with portions of the column shell broken away to illustrate a third embodiment of the lower cross flow trays of the present invention.
Figure 11:
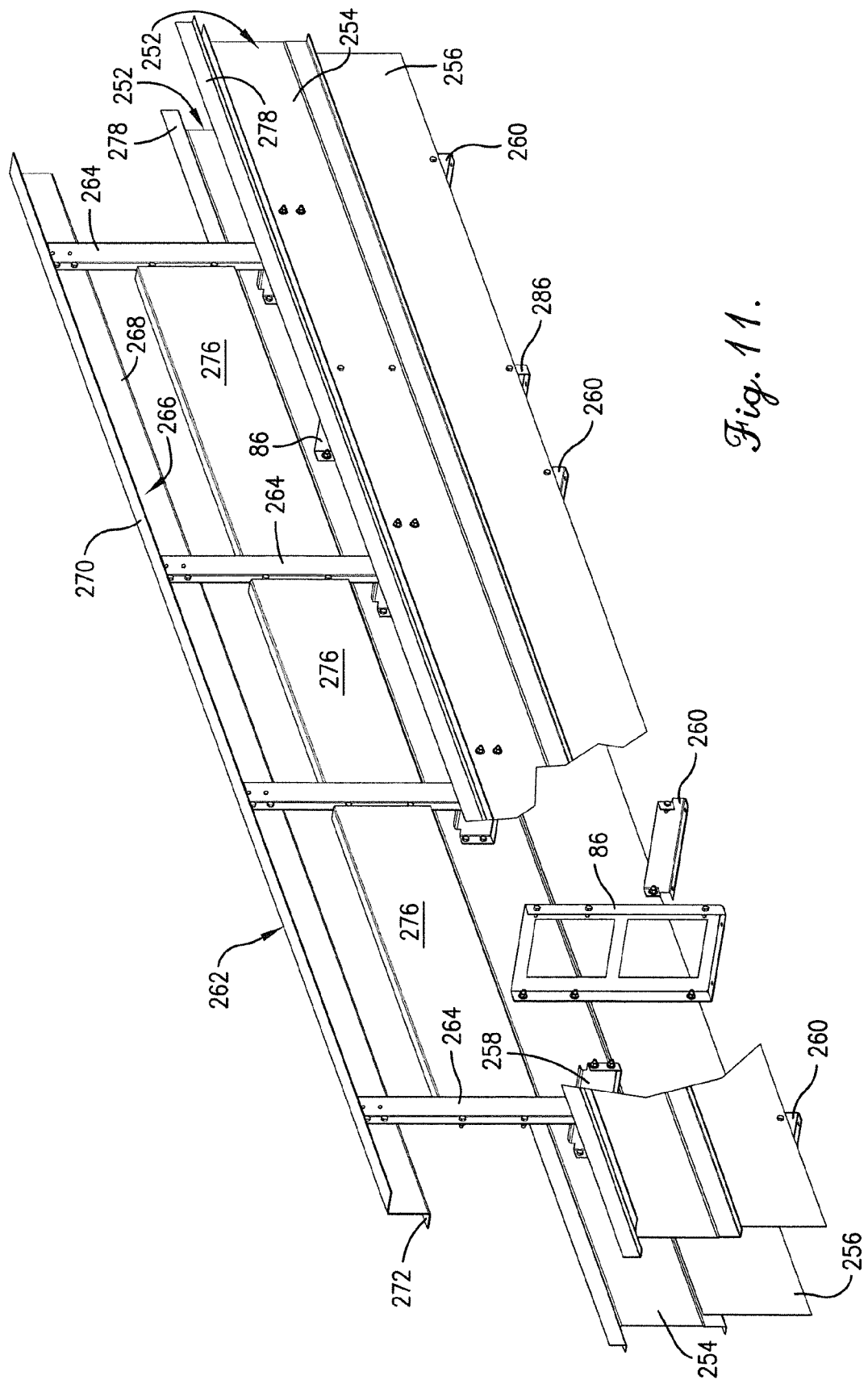
FIG. 11 is a top perspective view of another embodiment of a support system used with the center downcomer of the third embodiment of the lower cross flow trays of the present invention.

Turning now to FIGS. 10 and 11, upper and lower cross flow trays 222 and 224 and a support system 262 are shown and differ in the following respects from upper and lower cross flow trays 22 and 24 and support system 62 shown in FIGS. 1-4 and 6-8. All of the panels 226 except for the outer panels 226 of the upper cross flow tray 222 extend from the side downcomers 228 and 230 to the centerline of the tray deck 226 where they abut and are bolted to the beam 266 of the support system 262. Because the panels 226 abut at the centerline, the stiffening flanges 234 can be removed in the area of the beam 266 so that the beam 266 does not need to include cutouts for the stiffening flanges 234. The center downcomer 240 includes additional rectangular-framed braces 286 are of a sufficient height to be bolted to both the upper and lower wall segments 254 and 256 of the downcomer walls 252. These additional braces 286 are spaced apart at predetermined intervals from each other and from the upper braces 258 and 260. In all other respects, the upper and lower cross flow trays 222 and 224 and support system 262 are generally the same as the upper and lower cross flow trays 22 and 24 and support system 62. For ease of reference, the same reference numerals preceded by the numeral "2" have been used in FIGS. 10 and 11 to refer to like components shown in FIGS. 1-4 and 6-8.

Figure 12:
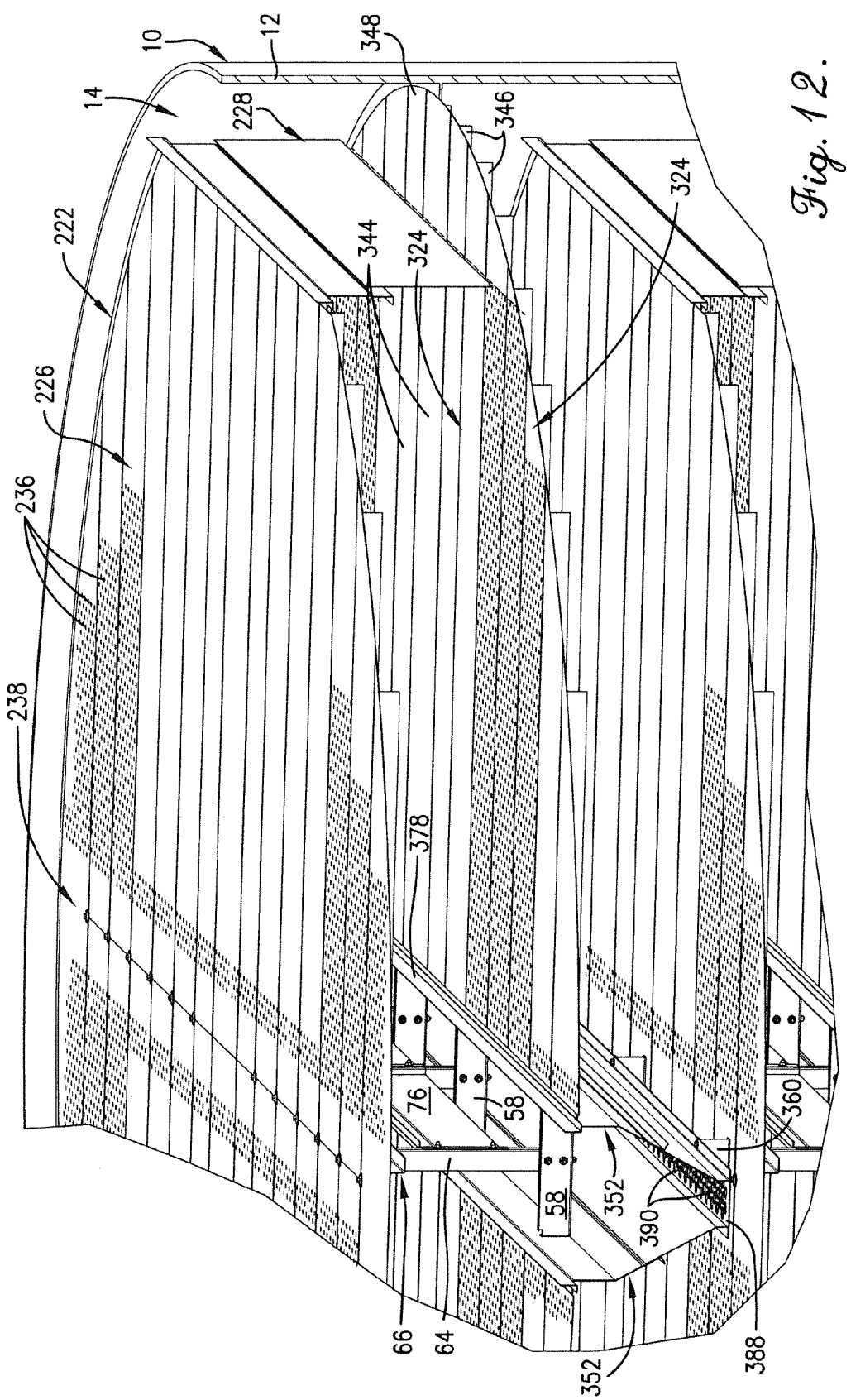
FIG. 12 is a fragmentary, side perspective view of a mass transfer column with portions of the column shell broken away to illustrate a fourth embodiment of the lower cross flow trays and a second embodiment of the upper cross flow trays of the present invention.
Figure 13:
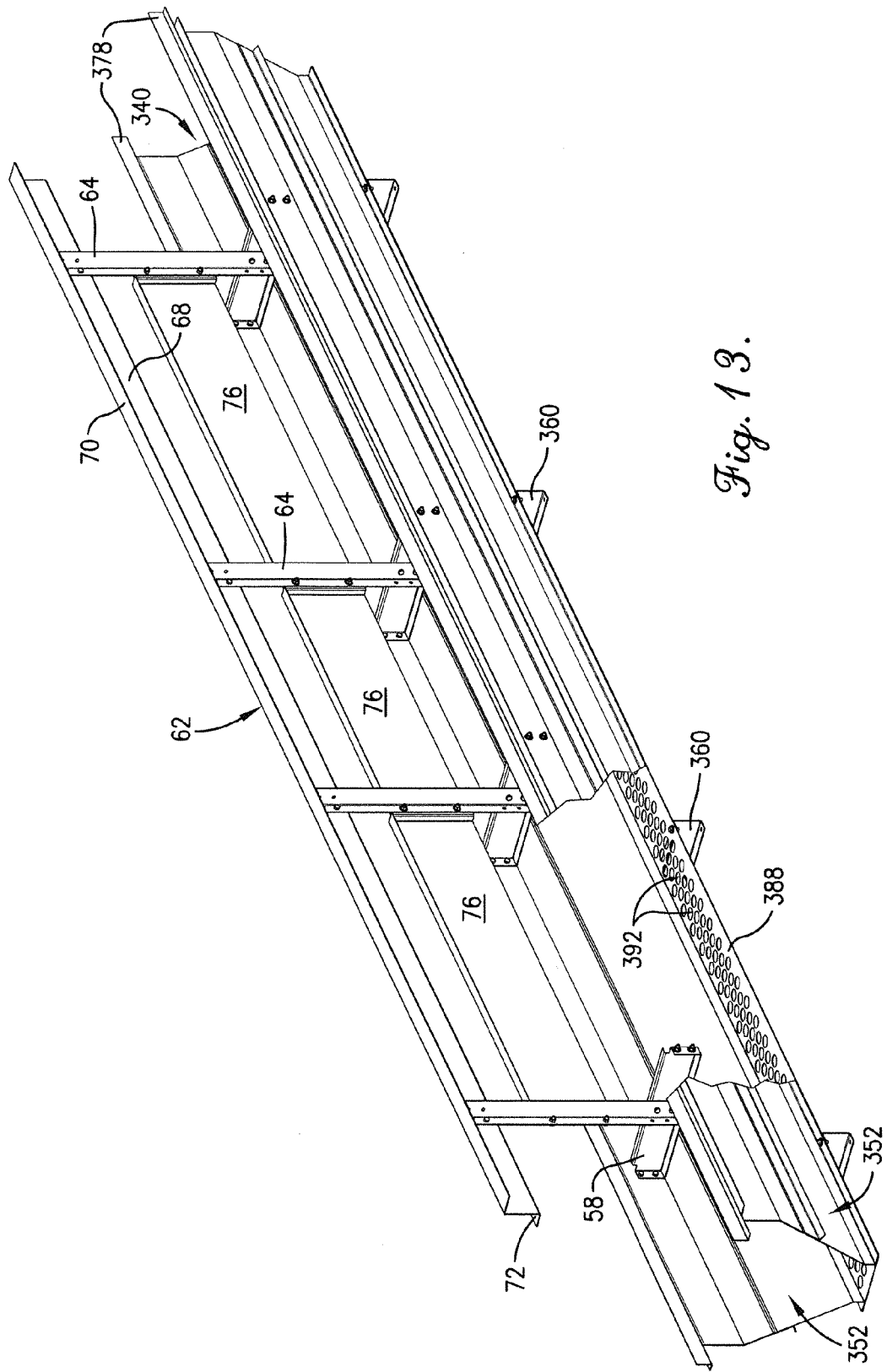
FIG. 13 is a top perspective view of another embodiment of a support system used with the center downcomer of the fourth embodiment of the lower cross flow trays of the present invention.

Turning now to FIGS. 12 and 13, another embodiment of a center downcomer with which the support system 62 may be used is designated by the numeral 340. Center downcomer 340 has inclined downcomer walls 352 that terminate at a floor plate 388 containing louvers 390 (FIG. 12) or simple apertures 392 (FIG. 13). The lower braces 360, rather than extending between the downcomer walls 352, underlie the floor plate 388 and support the downcomer walls 352 on the inlet region 238 of the tray deck 226 of the underlying lower cross flow tray 224. In all other respects, the upper cross flow tray 322 may be of the same construction as the upper cross flow tray 222. The same reference numerals preceded by the numeral "3" rather than "2" have been used to refer to like components shown in FIGS. 10 and 11.

Figure 14:
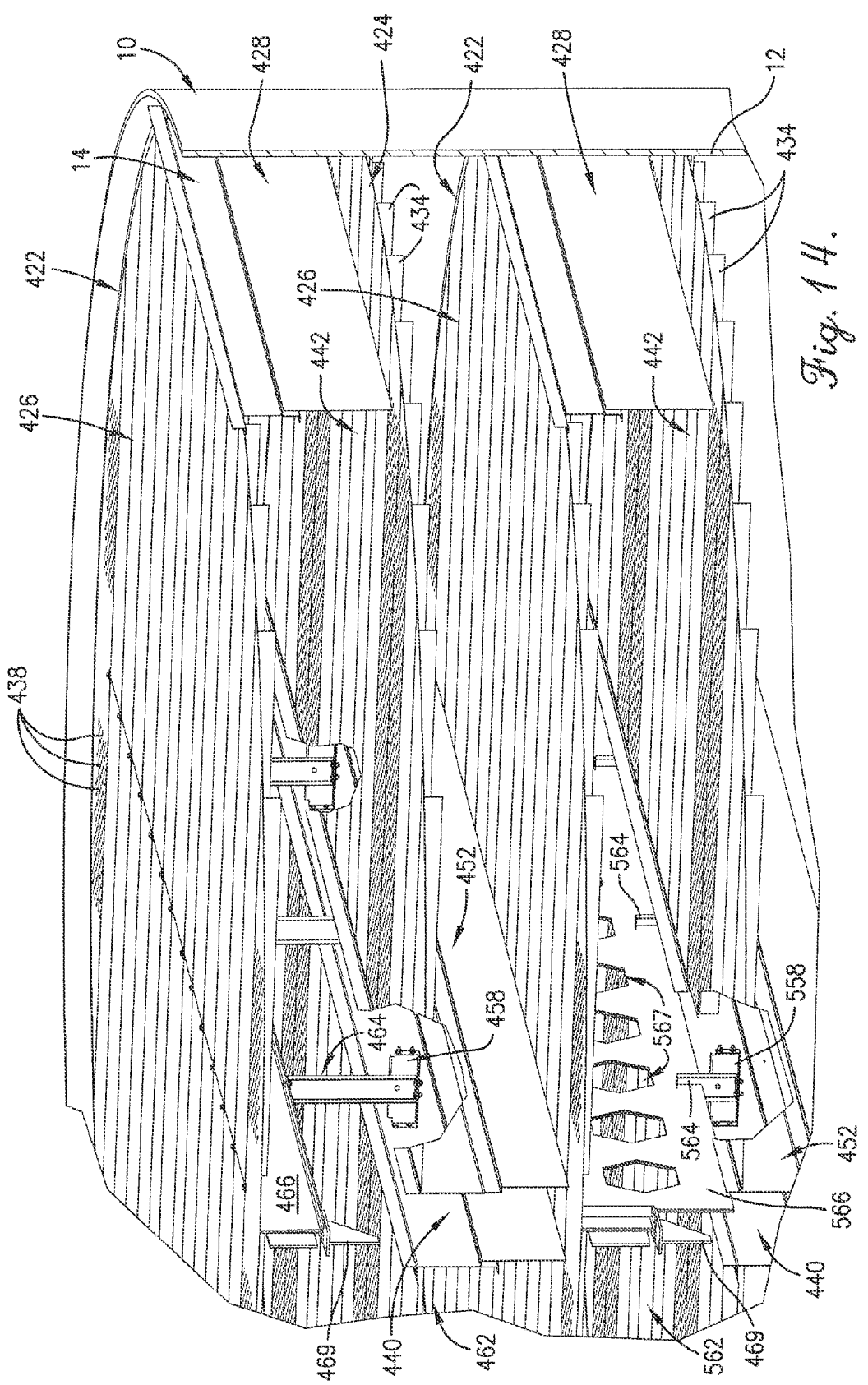
FIG. 14 is a fragmentary, side perspective view of a mass transfer column with portions of the column shell broken away to illustrate a fifth embodiment of the lower cross flow trays of the present invention.

Turning now to FIG. 14, adjacent pairs of upper and lower cross flow trays 422 and 424 are shown, along with corresponding first and second support systems 462 and 562. The upper and lower trays 422 and 424 and the support systems 462 and 562 differ in the following respects from the upper and lower cross flow trays 22 and 24 and the support system 62 shown in FIGS. 1-4 and 6-8. The horizontally-extending beams 466 and 566 of the support systems 462 and 562 are also vertically elongated. The beam 566 of the support system 562 extends to the same vertical elevation as, or to a vertical elevation just below, the upper edges of the walls 452 of the central downcomer 440 of the lower tray 424 of the second pair of trays. As also shown in FIG. 14, the elongated beam 566 further includes a plurality of laterally-spaced cut-outs 567, positioned at a desired interval along the length of the beam 566. Although shown as being polygonal in cross-section, the cut-outs 567 may be of any size and/or shape, and the number and spacing of such cut-outs can be determined based on the specific application.

Additionally, the beams 466 and 566 each include a knife edge 469 located at or near the terminal edge of the support beam 466 or 566 for helping to control foam and/or heavy froth within each of the central downcomers 440. Neither of the support systems 462 or 562 includes a set of lower braces 60 coupled to an underlying upper tray. Accordingly, in the embodiment shown in FIG. 14, the lower tray 424 of each pair is not physically coupled to the upper tray 422 of the underlying pair of trays. In all other respects, both sets of the upper and lower cross flow trays 422 and 424 and the support systems 462 and 562 shown in FIG. 14 are generally the same as the upper and lower cross flow trays 22 and 24 and the support system 62. For ease of reference, the same reference numerals preceded by the numeral "4" have been used in FIG. 14 to refer to like components shown in FIGS. 1-4 and 6-8.

Figure 15:
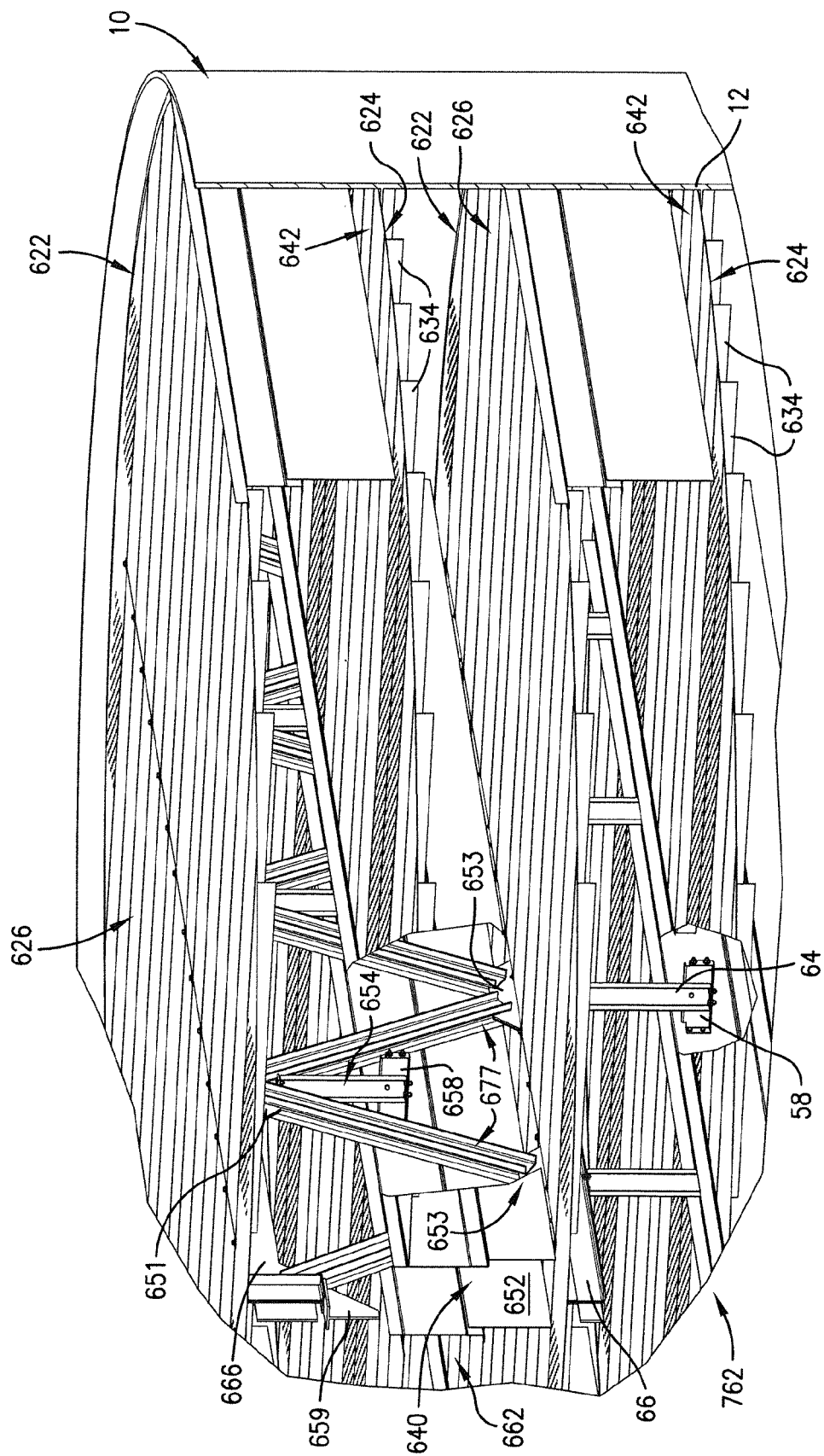
FIG. 15 is a fragmentary, side perspective view of a mass transfer column with portions of the column shell broken away to illustrate a sixth embodiment of the lower cross flow trays of the present invention.

Turning now to FIG. 15, adjacent pairs of upper and lower cross flow trays 622 and 624 and first and second support systems 662 and 762 are shown and differ in the following respects from the adjacent pairs of upper and lower cross flow trays 422 and 424 and the support systems 462 and 562 as shown in FIG. 14. As shown in FIG. 15, the first support system 652 is at least partially disposed between the upper set of upper and lower cross flow trays 622 and 624 and includes one or more pairs of anchor tabs positioned along the direction of extension of the downcomer 640. Each pair of anchor tabs includes an upper anchor tab 651 and a lower anchor tab 653 arranged in a staggered configuration with respect to each other and the direction of extension of the central downcomer 640. The upper anchor tab 651 of each pair is coupled to a lower surface of the upper tray deck 626, while the lower anchor tab 653 is coupled to the upper surface of the upper tray deck 626 of the underlying upper tray 622 of the adjacent pair.

A transverse support beam 677 extends generally diagonally between the upper 651 and lower 653 anchor tabs of each pair. Because of the staggered configuration of the anchor tabs 651 and 653, the adjacent transverse beams 677 extend in generally opposite diagonal directions. The elongated strut members 654 of the support system 652 are also coupled to the upper anchor tabs 653 of each pair and are generally disposed between pairs of oppositely-extending transverse support beams 677. The second support system 762 shown in FIG. 14 is nearly the same as the support system 62 shown in FIGS. 2 and 3, except that the support system 762 does not include anti-jump baffles. In all other respects, the upper and the lower cross flow trays 622 and 624, as well as the first and second support systems 652 and 762, may be of the same construction as the similar components described with respect to FIGS. 1-4 and 6-8. The same reference numerals preceded by the numeral "6" have been used to refer to like components shown in Figs. 1-14.

While the invention has been described with respect to a support system that connects to a center downcomer of a lower cross flow tray, it is to be understood that the invention also may include using such a support system with an intermediate, rather than a center, downcomer in a multi-pass cross flow tray.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A tray assembly for use in a mass transfer column, said tray assembly comprising:
    a first upper cross flow tray comprising a first generally planar upper tray deck and at least one downcomer for removing liquid from said first upper deck;
    a first lower cross flow tray vertically spaced from said first upper tray, wherein said first lower tray comprises a first generally planar lower tray deck and an inlet area positioned proximate said downcomer of said first upper tray for receiving liquid from said first upper tray, wherein said first lower tray further comprises at least one centrally located downcomer positioned at or near the center of said lower deck for removing liquid therefrom, wherein said centrally located downcomer comprises a pair of spaced-apart parallel walls extending in a direction generally perpendicular to the direction of liquid flow across said first lower deck; and a support system at least partially disposed between said first upper and lower trays, said support system comprising a plurality of horizontally-spaced braces coupled to and extending between said walls of said centrally located downcomer, a support beam coupled to a lower surface of said upper deck, and a plurality of elongated strut members coupled to and extending between said support beam and each of said braces, wherein said support beam includes a lower flange, an upper flange, and a vertical section disposed therebetween, wherein said first upper deck of said first upper tray comprises a plurality of deck panels, wherein said upper flange of said support beam is fastened to a lower surface of at least a portion of said deck panels, and wherein at least a portion of said deck panels comprise a stiffening flange extending downwardly from said lower surface thereof, wherein said upper flange of said support beam includes a plurality of cut-outs configured to accommodate said stiffening flanges.

2. The tray assembly of claim 1, further comprising a second upper cross flow tray underlying said first lower tray and vertically spaced therefrom, wherein said second upper tray comprises a second upper tray deck and an inlet region positioned proximate said centrally located downcomer, wherein lower edges of said walls of said centrally located downcomer are spaced from said inlet region of said second upper deck to thereby define a clearance for allowing liquid to flow from said centrally located downcomer onto said inlet region of said second upper deck.

3. The tray assembly of claim 2, wherein said support system further comprises a plurality of horizontally-spaced lower braces extending between and coupled to a lower portion of said walls of said centrally located downcomer, wherein said lower braces are also coupled to said second upper deck of said second upper tray.

4. The tray assembly of claim 3, wherein at least a portion of said lower braces extends below lower terminal edge of said walls of said centrally located downcomer.

5. The tray assembly of claim 3, further comprising a perforated floor plate coupled to and extending between lower terminal edges of said walls of said centrally located downcomer and covering at least a portion of the lower opening of said centrally located downcomer, wherein said lower braces are disposed beneath the lower terminal edges of said walls of said centrally located downcomer and interconnect said walls of said centrally located downcomer to said second upper deck of said second upper tray.

6. The tray assembly of claim 2, wherein said walls of said centrally located downcomer include an upper and a lower portion; and further comprising a plurality of rectangular-framed braces disposed within said centrally located downcomer and coupled to both the upper and lower portions of said walls, wherein said rectangular-framed braces are also coupled to said second upper deck of said second upper tray.

7. The tray assembly of claim 2, further comprising at least one pair of anchor tabs, wherein each pair of anchor tabs includes an upper anchor tab coupled to said beam and a lower anchor tab coupled to said second upper deck of said second upper tray, wherein said upper and lower anchor tabs of said at least one pair are staggered from each other along the direction of extension of said centrally located downcomer; and further comprising at least one transverse support member extending diagonally between said upper and lower anchor tabs of said at least one pair.

8. The tray assembly of claim 1, wherein said deck panels comprise a first group of deck panels extending from one end of said upper tray deck to the center thereof and a second group of deck panels extending from the other end of said upper tray deck to said center thereof, wherein at least a portion of terminal ends of said deck panels in said first group are configured to abut and/or overlap at least a portion of terminal ends of said deck panels at the centerline of said upper tray deck.

9. The tray assembly of claim 1, wherein said downcomer walls include an upper wall portion and a lower wall portion.

10. The tray assembly of claim 9, wherein said lower wall portion is configured to be adjustable upon installation of said tray assembly in a mass transfer column.

11. The tray assembly of claim 9, wherein said lower portion of said downcomer wall is inclined.

12. The tray assembly of claim 1, wherein the centrally located downcomer is located at the centerline of said lower cross flow tray.

13. A tray assembly for use in a mass transfer column, said tray assembly comprising:
   a first upper cross flow tray comprising a first generally planar upper tray deck and at least one downcomer for removing liquid from said first upper deck;
   a first lower cross flow tray vertically spaced from said first upper tray, wherein said first lower tray comprises a first generally planar lower tray deck and an inlet area positioned proximate said downcomer of said first upper tray for receiving liquid from said first upper tray, wherein said first lower tray further comprises at least one centrally located downcomer positioned at or near the center of said lower deck for removing liquid therefrom, wherein said centrally located downcomer comprises a pair of spaced-apart parallel walls extending in a direction generally perpendicular to the direction of liquid flow across said first lower deck;
   a support system at least partially disposed between said first upper and lower trays, said support system comprising a plurality of horizontally-spaced braces coupled to and extending between said walls of said centrally located downcomer, a support beam coupled to a lower surface of said upper deck, and a plurality of elongated strut members coupled to and extending between said support beam and each of said braces;
   a second upper cross flow tray underlying said first lower tray and vertically spaced therefrom, wherein said second upper tray comprises a second upper tray deck and an inlet region positioned proximate said centrally located downcomer, wherein lower edges of said walls of said centrally located downcomer are spaced from said inlet region of said second upper deck to thereby define a clearance for allowing liquid to flow from said centrally located downcomer onto said inlet region of said second upper deck; and
   at least one pair of anchor tabs, wherein each pair of anchor tabs includes an upper anchor tab coupled to said beam and a lower anchor tab coupled to said second upper deck of said second upper tray, wherein said upper and lower anchor tabs of said at least one pair are staggered from each other along the direction of extension of said centrally located downcomer; and further comprising at least one transverse support member extending diagonally between said upper and lower anchor tabs of said at least one pair,
wherein each elongated strut member of said plurality of elongated strut members is also coupled to said upper anchor tab of a respective pair of anchor tabs.

14. The tray assembly of claim 13, further comprising a second pair of anchor tabs arranged in a staggered in a similar configuration as said at least one pair of anchor tabs; and further comprising, an oppositely-extending transverse support member extending between said upper anchor tab of said at least one pair of anchor tabs and the lower anchor tab of said second pair of anchor tabs, wherein said elongated strut member is disposed between said at least one transverse support member and said oppositely-extending support member.

15. A tray assembly for use in a mass transfer column, said tray assembly comprising:
a first upper cross flow tray comprising a first generally planar upper tray deck and at least one downcomer for removing liquid from said first upper deck;
a first lower cross flow tray vertically spaced from said first upper tray, wherein said first lower tray comprises a first generally planar lower tray deck and an inlet area positioned proximate said downcomer of said first upper tray for receiving liquid from said first upper tray, wherein said first lower tray further comprises at least one centrally located downcomer positioned at or near the center of said lower deck for removing liquid therefrom, wherein said centrally located downcomer comprises a pair of spaced-apart parallel walls extending in a direction generally perpendicular to the direction of liquid flow across said first lower deck; and
a support system at least partially disposed between said first upper and lower trays, said support system comprising a plurality of horizontally-spaced braces coupled to and extending between said walls of said centrally located downcomer, a support beam coupled to a lower surface of said upper deck, and a plurality of elongated strut members coupled to and extending between said support beam and each of said braces,
wherein said beam comprises a vertically elongated beam defining a vertically extended surface, wherein said vertically extending surface extends downwardly into the space defined between said walls of said centrally located downcomer, wherein said vertically extending surface includes one or more cut-outs spaced along the direction of horizontal elongation of said vertically extending plate.

16. A tray assembly for use in a mass transfer column, said tray assembly comprising:
a first upper cross flow tray comprising a first generally planar upper tray deck and at least one downcomer for removing liquid from said first upper deck;
a first lower cross flow tray vertically spaced from said first upper tray, wherein said first lower tray comprises a first generally planar lower tray deck and an inlet area positioned proximate said downcomer of said first upper tray for receiving liquid from said first upper tray, wherein said first lower tray further comprises at least one centrally located downcomer positioned at or near the center of said lower deck for removing liquid therefrom, wherein said centrally located downcomer comprises a pair of spaced-apart parallel walls extending in a direction generally perpendicular to the direction of liquid flow across said first lower deck;
a support system at least partially disposed between said first upper and lower trays, said support system comprising a plurality of horizontally-spaced braces coupled to and extending between said walls of said centrally located downcomer, a support beam coupled to a lower surface of said upper deck, and a plurality of elongated strut members coupled to and extending between said support beam and each of said braces; and
at least one anti-jump baffle disposed between two adjacent elongated strut members, wherein said anti-jump baffle comprises a vertically extending plate coupled to said adjacent strut members via one or more mounting flanges, wherein said vertically extending plate is positioned along the centerline of said central downcomer.

17. The tray assembly of claim 16, wherein mounting flanges comprises a dog-legged mounting flange and at least a portion of said elongated strut members are positioned off of said centerline.

18. The tray assembly of claim 16, wherein said first lower tray further comprises an inlet weir disposed proximate said inlet area for maintaining a liquid level on said lower tray deck, wherein an upper terminal edge of said inlet weir is located at approximately the same vertical elevation as a lower terminal edge of said vertically extending plate of said anti-jump baffle.

19. A tray assembly for use in a mass transfer column, said tray assembly comprising:
a first upper cross flow tray comprising a first generally planar upper tray deck and at least one downcomer for removing liquid from said first upper deck;
a first lower cross flow tray vertically spaced from said first upper tray, wherein said first lower tray comprises a first generally planar lower tray deck and an inlet area positioned proximate said downcomer of said first upper tray for receiving liquid from said first upper tray, wherein said first lower tray further comprises at least one centrally located downcomer positioned at or near the center of said lower deck for removing liquid therefrom, wherein said centrally located downcomer comprises a pair of spaced-apart parallel walls extending in a direction generally perpendicular to the direction of liquid flow across said first lower deck;
a support system at least partially disposed between said first upper and lower trays, said support system comprising a plurality of horizontally-spaced braces coupled to and extending between said walls of said centrally located downcomer, a support beam coupled to a lower surface of said upper deck, and a plurality of elongated strut members coupled to and extending between said support beam and each of said braces; and
one or more downwardly extending knife edges positioned on at least one terminal end of said beam.

* * * * *